Aug. 27, 1935.   J. WALKER   2,012,594
ARMORED CAR VENTILATING SYSTEM
Filed March 23, 1933
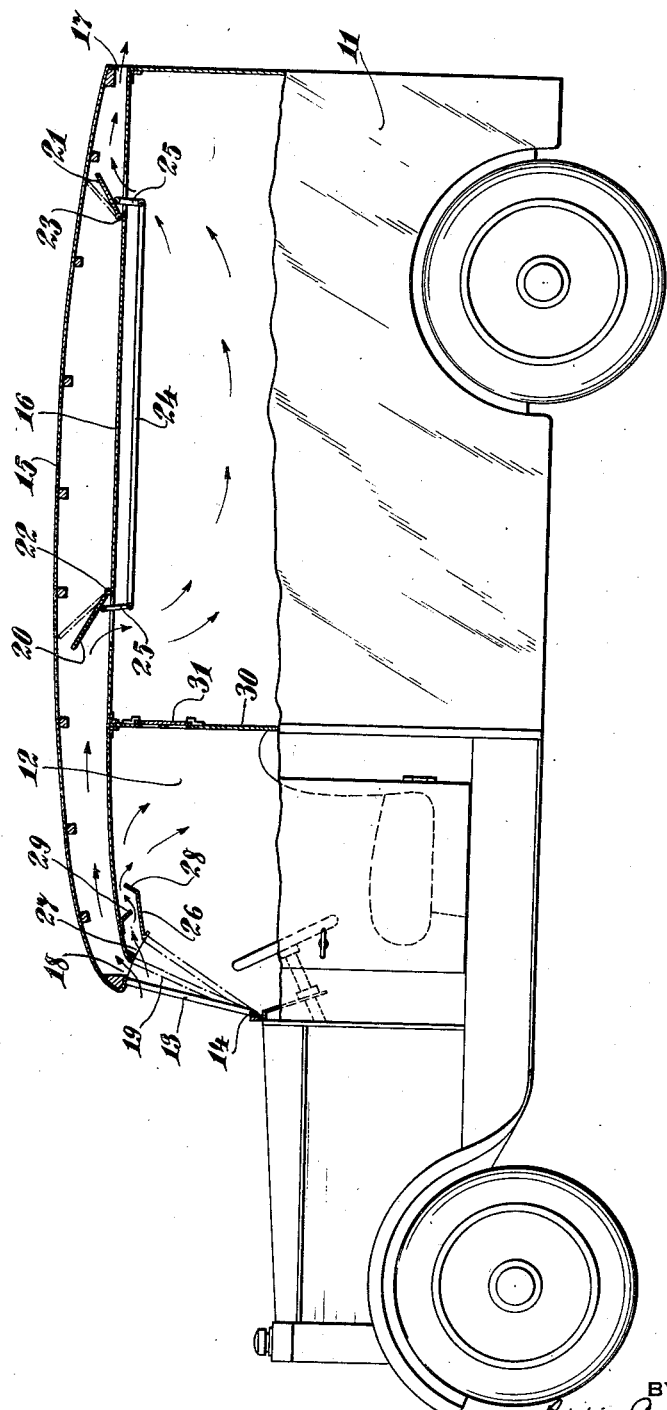
INVENTOR
John Walker,
BY
Redding, Greeley, O'Shea & Campbell
HIS ATTORNEYS

Patented Aug. 27, 1935

2,012,594

UNITED STATES PATENT OFFICE

2,012,594

ARMORED CAR VENTILATING SYSTEM

John Walker, Westfield, N. J., assignor to International Motor Company, New York, N. Y., a corporation of Delaware Application March 23, 1933, Serial No. 662,257

4 Claims. (Cl. 98—2)

The present invention relates to vehicle bodies and embodies, more specifically, an improved ventilating system for closed vehicle bodies particularly of the type commonly used in armored car service.

In such service, the body requirements are such as to prevent the use of adjustable windows or other apertures to facilitate the ventilation of the body. The desirability of affording adequate ventilation will be readily apparent and an object of the present invention is to provide a body construction wherein ventilating means is incorporated to facilitate the adequate ventilation of the body.

A further object of the invention is to provide a body construction having a closed body and isolated driver's compartment wherein means is provided for selectively ventilating the body and compartment without impairing the bullet-proof character of the vehicle.

Further objects of the invention will be readily apparent as it is described in connection with the accompanying drawing, the single figure of which is a view in side elevation partly broken away and in section showing a body constructed in accordance with the present invention.

Referring to the above drawing, a vehicle chassis is shown as provided with a body 11 which may be of bullet-proof character and a forward transverse compartment 12 is provided therein. The wind shield 13 is hinged at 14 adjacent the lower edge thereof and is adapted to swing rearwardly, as indicated in dot and dash lines.

The roof construction consists of an outer roof 15 and an inner roof 16 to form a ventilating duct and carry off heat from the roof. The space between the roofs 15 and 16 communicates with the exterior of the vehicle at 17 adjacent the rear thereof.

The roofs 15 and 16 extend forwardly of the body and terminate in spaced relationship to afford an opening 18 through which air may flow as indicated by the arrows. With the wind shield 13 in the position shown in solid lines, no air flows through the opening 18 but, upon adjusting the wind shield to the intermediate position shown in dot and dash lines at 19, air is diverted upwardly through the opening 18 and flows rearwardly through the duct formed by the roofs 15 and 16.

Ventilator doors 20 and 21 are hinged at 22 and 23, respectively, to swing upwardly and deflect air from the duct between the roofs 15 and 16 into the body as indicated by the arrows.

Movement of the doors 20 and 21 is controlled by a bar 24 which is connected to the respective doors by links 25.

In the transverse compartment, a deflector plate 26 is provided below the forward portion of the lower roof 16, being spaced therefrom to form an opening 27. The rearward portion of the deflector plate 26 is bent upwardly at 28 and a downwardly extending deflector plate 29 is provided between the plate 26 and roof 16 to prevent the direct entrance of bullets into the driver's compartment. A partition 30 separates the driver's compartment from the interior of the body 11 and a slidable shutter 31 is provided to afford communication between the partition and the interior of the body, as well as the passage of air therethrough.

It will thus be seen from the foregoing, that the complete ventilation of the body may be effected, the control of the ventilating air to the driver's compartment and body being selectively effected. Moreover, the ventilating means is of such character as to enable the interior of the body to be completely isolated in the event of a gas attack.

While the invention has been described with specific reference to the accompanying drawing, it is not to be limited, save as defined in the appended claims.

I claim as my invention:

1. A ventilated closed vehicle body having a windshield, an interior body portion and a driver's compartment forwardly of the body portion, a ventilating duct at the top of the body and having an opening adjacent the top of the windshield, said driver's compartment being formed with an opening adjacent the last named opening, means to hinge the windshield adjacent the bottom thereof whereby the top of the windshield may be positioned adjustably with respect to the openings to prevent air flow through both openings when the windshield is closed and to permit air flow through first one and then both openings as the windshield is moved from its closed position, and adjustable means to direct air from the duct into the body.

2. A ventilated closed vehicle body having a windshield, an interior body portion and a driver's compartment forwardly of the body portion, a ventilating duct at the top of the body extending throughout the length thereof and having an opening adjacent the top of the windshield and at the rear of the body, means to hinge the windshield adjacent the bottom thereof, a duct below the first duct in the upper portion of the driver's compartment having an opening adjacent the first opening whereby the top of the windshield may be positioned adjustably with respect to the openings to prevent air flow through both openings when the windshield is closed and to permit air flow through first one and then both openings as the windshield is moved from its closed position, and adjustable means to direct air from the first duct into the body and back into the said first duct adjacent the rear of the body.

3. A ventilated closed vehicle body having a windshield, an interior body portion and a driver's compartment forwardly of the body portion, a ventilating duct at the top of the body and having an opening adjacent the top of the windshield, said driver's compartment being formed with an opening adjacent the last named opening, and means to hinge the windshield adjacent the bottom thereof whereby the top of the windshield may be positioned adjustably with respect to the openings to prevent air flow through both openings when the windshield is closed and to permit air flow through first one and then both openings as the windshield is moved from its closed position.

4. A ventilated closed vehicle body having a windshield, an interior body portion and a driver's compartment forwardly of the body portion, a ventilating duct at the top of the body extending throughout the length thereof and having an opening adjacent the top of the windshield and at the rear of the body, means to hinge the windshield adjacent the bottom thereof, a duct below the first duct in the upper portion of the driver's compartment having an opening adjacent the first opening whereby the top of the windshield may be positioned adjustably with respect to the openings to prevent air flow through both openings when the windshield is closed and to permit air flow through first one and then both openings as the windshield is moved from its closed position, and adjustable means to direct air from the first duct into the body and back into said first duct adjacent the rear of the body.

JOHN WALKER.